United States Patent
Piedallu

[15] 3,635,150
[45] Jan. 18, 1972

[54] OSCILLATING DEEP FRYER

[72] Inventor: Marcel M. Piedallu, 2221 Mary Jane Lane, Park Ridge, Ill. 60068

[22] Filed: Dec. 17, 1969

[21] Appl. No.: 885,665

[52] U.S. Cl. ................................99/409, 99/348, 259/91
[51] Int. Cl. ..........................................A47j 37/12
[58] Field of Search ........................99/409, 403–408, 99/410–415, 238.1–238.7, 348, 352–353, 443, 236–237, 357, 371; 259/17, 27, 35, 47, 70, 73, 91, 59; 68/155; 74/25, 45

[56] References Cited

UNITED STATES PATENTS

| | | | |
|---|---|---|---|
| 706,401 | 8/1902 | Fleckenstein | 99/348 UX |
| 881,120 | 3/1908 | Guibbini | 99/371 |
| 1,125,691 | 1/1915 | Just | 68/155 |
| 1,230,040 | 6/1917 | Scott | 259/91 UX |
| 2,742,848 | 4/1956 | Case | 99/238.1 |
| 2,805,314 | 9/1957 | Michaelis | 99/403 X |
| 2,906,850 | 9/1959 | Meletio et al. | 99/403 UX |
| 3,087,413 | 4/1963 | Burroughs | 259/73 X |
| 3,503,592 | 3/1970 | Taylor et al. | 259/91 |

FOREIGN PATENTS OR APPLICATIONS

| | | | |
|---|---|---|---|
| 1,230,183 | 12/1966 | Germany | 99/403 |

*Primary Examiner*—William I. Price
*Assistant Examiner*—Arthur O. Henderson
*Attorney*—Hill, Sherman, Meroni, Gross & Simpson

[57] ABSTRACT

An oscillating deep fryer for cooking items such as souffle potatoes which has a deep-frying container with a convex bottom which is oscillated back and forth and also slightly up and down so as to properly cook items in the fryer. A heating element is connected to the fryer with a flexible power cable to provide heat for the unit.

5 Claims, 2 Drawing Figures

PATENTED JAN 18 1972

3,635,150

INVENTOR.
MARCEL M. PIEDALLU

BY Hill, Sherman, Meroni, Gross & Simpson ATTORNEYS

OSCILLATING DEEP FRYER

BACKGROUND OF THE INVENTION

1. Field of the Invention

This invention relates in general to cooking utensils and in particular to an oscillating deep fryer for cooking souffle potatoes or other items.

2. Description of the Prior Art

In the past it has been necessary for cooks to continually stir many items as they are fried. For example, in prior cooking processes of souffle potatoes a shallow casserole or frying pan is used and after sliced potatoes are added to the oil in the pan the cook must continually stir to prevent the potatoes from burning and to cook them uniformly. This makes it very difficult to prepare large quantities of such items.

SUMMARY OF THE INVENTION

The present invention provides an oscillating deep fryer containing a container with a convex bottom into which oil or suitable shortening is placed and which is driven by a motor and transmission system so as to be continually oscillated back and forth and slightly up and down. A heating unit is attached to the frying container and is connected by flexible power cables to a suitable power supply and control.

Other objects, features and advantages of the invention will be readily apparent from the following description of a preferred embodiment thereof taken in conjunction with the accompanying drawings, although variations and modifications may be effected without departing from the spirit and scope of the novel concepts of this disclosure, and in which:

DESCRIPTION OF THE PREFERRED EMBODIMENT

Figures 1, 2:
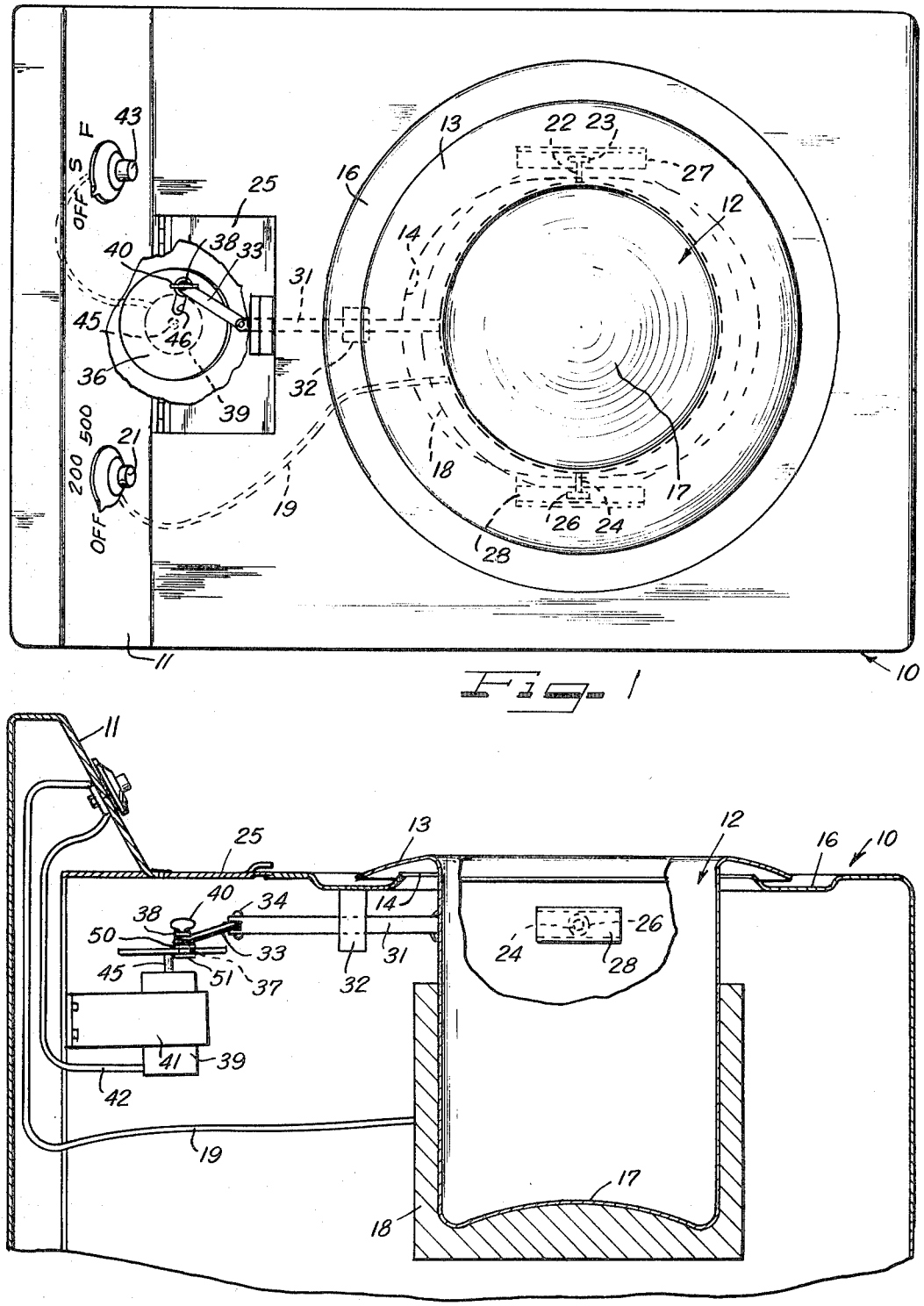
FIG. 1 is a top plan view of the oscillating deep fryer of the invention.
FIG. 2 is a side sectional view of the oscillating deep fryer.

FIGS. 1 and 2 illustrate the oscillating deep fryer of the invention. A cabinet, designated generally as 10, has an upwardly extending control portion 11 and carries an oscillating deep frying container 12. The container 12 is formed with an outwardly extending lip 13 that overlaps the edges of an opening 14 formed in the top of the cabinet 10. A depression 16 is formed in the top of the cabinet 10 about the lip 13 of the container 12 so as to catch any oil or grease that might be removed from the container 12.

The bottom 17 of the container 12 is convex so as to improve the action of the oil or shortening within the container 12 and an insulated heating element 18 is attached to the container 12 to provide heat. A heating cable 19 extends from the heating element 18 to a control 21 mounted on the upwardly extending portion 11 of the cabinet 10.

A pair of supporting shafts 22 and 24 extend from opposite sides of the container 12 and carry roller 23 and 26, respectively receivable in tracks 27 and 28 which are connected by suitable bracket members to the cabinet 10. The rollers 23 and 26 and tracks 27 and 28 may be similar to drawer rollers and tracks to allow the container 12 to move back and forth relative to the cabinet 10. A drive link 31 is connected to the container 12 and passes through a guide 32 which is attached to the top of the cabinet 10. Link 31 is connected to a connecting rod 33 which is pivotally supported by the pin 34 to the free end of the member 31. The other end of link 33 is connected by pin 38 to a block 37. Block 37 is adjustably movable in a slot 46 of a disc 36. By moving block 37 relative to the center axis 45 of the disc 36 the movement of the container 12 relative to the tracks 27 and 28 can be controlled. A thumb screw 40 is connected to the shaft 38 and allows the block 37 to be clamped in a fixed position relative to the disc 36 with the washers 50 and 51. A door 25 maybe formed in the cabinet 10 to allow access to the thumb screw 40.

As best shown in FIG. 1, the bracket 32 has a slot that allows the member 31 to move up and down as it moves back and forth. A motor 39 is supported by bracket 41 and may be energized by a control knob 43 and has an output shaft 45 which drives the disc 36 thus moving the link 33 and the shaft 31 to drive the utensil 12 relative to the tracks 27 and 28. The motor 39 is slightly tilted as best shown in FIG. 2 so that the member 31 is driven up and down as well as back and forth to thus impart a slight up and down motion to the container 12 as well as a back-and-forth motion.

The motor 39 may be a DC motor whose speed may be adjusted by the knob 43 and might operate in the range of from 60 to 100 r.p.m., for example. The throw of the member 31 might vary in the range of from 2 to 5 inches by moving the block 37 relative to the disc 36.

In operation, the oscillating deep fryer may be made in different sizes and may be used for frying potatoes, fish, breaded onion rings, breaded meats, etc., plus precooking souffle potatoes. A suitable oil or shortening is placed in the container 12 and the temperature control 21 is moved to the desired temperature. The motor 39 is started by adjusting the control know 43 to oscillate the container 12 back and forth relative to the cabinet 10. It is to be realized of course that the position of the block 37 relative to the disc 36 and the slot 46 is adjustable by loosening the setscrew 40 and moving the block 37 to the position for the proper throw of the container 12. The further the block 37 is moved outwardly from the shaft 45, the greater will be the movement of the container 12. Thus, if a large throw is desired, the block 37 may be moved outwardly toward the outer end of the disc 36 in the slot 46 whereas if a smaller throw is desired the block 37 may be moved toward the center of the support shaft 45. The setscrew 40 is tightened to lock the block 37 and washers 50 and 51 to the disc 36 at the desired position.

The rollers 23 and 26 provide smooth movement in the tracks 27 and 28 in order that shortening will not be splashed from the container 12. Any oil which is dripped from the container 12 will pass over the edge 13 of the container 12 into the depression 16 where it may be collected and removed in a suitable fashion.

It is seen that this invention provides means for easily and simply cooking large quantities of materials and although it has been described with respect to a preferred embodiment, it is not to be so limited as changes or modifications may be made therein which are within the full intended scope as defined by the appended claims.

What I claim is:

1. An oscillating fryer comprising:
   a frame member;
   a cooking container supported for oscillatory movement by said frame member;
   means for driving said cooking container relative to said frame member;
   heating means connected to said cooking container and movable therewith;
   said driving means comprising an electric motor attached to the frame, crank means attached to the output shaft of said electric motor, a connecting rod connected between said crank means and said container to drive it;
   said crank means comprising a disc and said disc being formed with an adjustable coupling to which said connecting rod is connected to allow the throw of said connecting rod to be adjusted; and
   said disc being supported so that slight up-and-down motion is coupled to said connecting rod as well as back-and-forth motion.

2. An oscillating fryer according to claim 1, wherein said frame member is formed with an opening and said container is supported within said opening, and the container is formed with a ledge which extends beyond the edges of said opening.

3. An oscillating fryer according to claim 2, wherein the portion of said frame member about said opening is formed with a depression.

4. An oscillating fryer according to claim 1, wherein the bottom of said container is convex as viewed from the inside of said container.

5. An oscillating fryer according to claim 1, wherein said container has a pair of rollers attached to opposite sides thereof, and a pair of tracks in which said rollers are received are attached to said frame member.

* * * * *